12) United States Patent
Lin (10) Patent No.: US 10,748,511 B2
(45) Date of Patent: Aug. 18, 2020

(54) METHOD AND SYSTEM FOR DETECTING VIDEO SCAN TYPE (71) Applicant: REALTEK SEMICONDUCTOR CORP., Hsinchu (TW)

(72) Inventor: Ming-Ta Lin, New Taipei (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 0 days.

(21) Appl. No.: 16/163,650

(22) Filed: Oct. 18, 2018

(65) Prior Publication Data
US 2019/0172428 A1 Jun. 6, 2019

(30) Foreign Application Priority Data
Dec. 6, 2017 (TW) .............................. 106142749 A (51) Int. Cl.
G09G 5/00 (2006.01)
G09G 5/42 (2006.01)
H04N 7/01 (2006.01)
G09G 5/36 (2006.01)

(52) U.S. Cl.
CPC ................ G09G 5/42 (2013.01); G09G 5/36 (2013.01); H04N 7/012 (2013.01); G09G 2310/0202 (2013.01); G09G 2310/0224 (2013.01); G09G 2310/0229 (2013.01); G09G 2320/103 (2013.01)

(58) Field of Classification Search
CPC ............ H04N 7/012; H04N 21/44008; H04N 19/112; H04N 19/172; G09G 2310/0202; G09G 2320/103; G09G 2310/0224; G09G 2310/0229
See application file for complete search history.

(56) References Cited

U.S. PATENT DOCUMENTS

| 7,450,180 B2 | 11/2008 | Baylon et al. |
| 8,068,175 B2 | 11/2011 | Baylon et al. |
| 2006/0139491 A1 | 6/2006 | Baylon et al. |
| 2012/0008834 A1* | 1/2012 | Chandrasekaran .... H04N 5/144 382/107 |

FOREIGN PATENT DOCUMENTS

| CN | 103946732 A | 7/2014 |
| WO | WO 2013/049248 A2 | 4/2013 |

* cited by examiner

Primary Examiner — Hau H Nguyen
(74) Attorney, Agent, or Firm — Li & Cai Intellectual Property (USA) Office (57) ABSTRACT The disclosure is related to a method and a system for detecting a video scan type. In the method, a first frame and a second frame are firstly extracted from a video. The scan lines of each frame can be divided into a top field and a bottom field. A first zipper index of the combination of the top field of the first frame and the bottom field of the second frame is obtained. Further, a second zipper index of the combination of the bottom field of the first frame and the top field of the second frame is also obtained. A zipper index difference between the first zipper index and the second zipper index is calculated and is provided to determine the video scan type as an interlaced-scan video or a progressive-scan video.

18 Claims, 12 Drawing Sheets

| top 1 | bottom 2 | top 1 | bottom 2 | top 1 | bottom 2 | top 1 | bottom 2 | top 1 | bottom 2 | time(i)-time(i+1)

FIG. 1A

| top 2 | bottom 1 | top 2 | bottom 1 | top 2 | bottom 1 | top 2 | bottom 1 | top 2 | bottom 1 | time(i)-time(i+1)

METHOD AND SYSTEM FOR DETECTING VIDEO SCAN TYPE

FIELD OF THE DISCLOSURE

The disclosure is related to a method and a system for video detection, and in particular to a method for detecting a video scan type according to characteristics of pixels in the frames of a video, and a system thereof.

BACKGROUND OF THE DISCLOSURE

Conventional video scan formats are generally categorized into a progressive-scan type and an interlaced-scan type. The video scan format governs the mode of transmission of a video. A software player or a hardware player decodes and plays the video according to header data of the video, and especially header data concerning the scan format.

For example, a conventional TV screen, e.g. a cathode ray tube (CRT) screen, generally adopts an interlaced-scan type of video scan format. The interlaced-scan process scans the lines of a video from top to bottom, e.g. scanning the odd-numbered scan lines (1, 3, 5 . . . ) and the even-numbered scan lines (2, 4, 6 . . . ) in an interlaced manner. The odd-numbered scan lines form a kind of field, namely a top field. The even-numbered scan lines form another kind of field, namely a bottom field. The scan lines of the top field and the scan lines of the bottom field are interlaced to form a frame. With the interlaced scan type, one field is composed of either the odd-numbered scan lines or the even-numbered scan lines, and only half of the scan lines will be transmitted and displayed at a time. However, the human eye will not notice that only half of the scan lines are displayed, but will perceive a full frame due to persistence of vision.

Unlike the interlaced-scan video, each frame of a progressive-scan video can be obtained by scanning the scan lines of a video one-by-one in a consecutive order. The progressive-scan video is a full-frame based video without the aspect of the fields.

However, if the header of the video records a wrong video scan type, the player may not play the video correctly, such that unstable video images may be produced thereby. In an exemplary example, the player is such as a television. The player extracts data from a video header when it receives a video to determine the scan type thereof, i.e., a progressive-scan video or an interlaced-scan video, then plays the video by an appropriate scan algorithm. For example, when the player, e.g. a television, receives an interlaced-scan video from a television station, the television plays the video by performing a de-interlaced scan algorithm for gaining an optimal visual effect. Otherwise, a zipper phenomenon may occur if the television plays the interlaced-scan video by a progressive-scan process. Furthermore, image flickering, e.g., overlapping or zigzagging at the edges of the video, may occur if a TV program is played in a wrong scan type on a media player of a computer.

SUMMARY OF THE DISCLOSURE

In response to the above-referenced technical inadequacies, the present disclosure provides a method and a system for detecting a video scan type of a video.

The method for detecting a video scan type according to the present disclosure is different from conventional methods of determining a video scan type that are based only on information such as metadata or header of a video. The disclosed method for detecting a video scan type and a system thereof provide a solution that refers directly to the pixel characteristics for determination of the video scan type. The video scan types can be categorized as progressive-scan types and interlaced-scan types.

In accordance with the embodiment of the specification, the method for detecting a video scan type includes a step for obtaining pixel information of the two consecutive frames extracted from a video. The two frames include a first frame and a second frame. The scan lines of each frame are divided into a set of top field scan lines and a set of bottom field scan lines. The method then calculates a first zipper index from a combination of the top field of the first frame and the bottom field of the second frame, and a second zipper index from a combination of the bottom field of the first frame and the top field of the second frame.

In the method, a zipper index difference between the first zipper index and the second zipper index is obtained. The zipper index difference can be used to determine the video scan type of a video. The video would be an interlaced-scan video if the value of the zipper index difference is larger than that of a predetermined threshold; otherwise, the video is a progressive-scan video if the value of the zipper index difference is not larger than that of the predetermined threshold.

In one embodiment of the present disclosure, while a video is determined as an interlaced-scan video, the relation between a first zipper index and a second zipper index thereof can be used to determine a field order of the interlaced-scan video.

The first zipper index or the second zipper index is computed using a zipper value algorithm. The concept of the algorithm is to calculate a luminance of adjacent pixels of a frame, and obtain zipper values of the pixels. The zipper values of the pixels are then used to calculate a zipper index of each frame. The zipper index acts as a reference to determine a video scan type and a field order of the video.

In one embodiment of the system for detecting a video scan type, the system can be applied to a player. The player can have a memory and a processor. The method for detecting a video scan type is executed by the processor in the system for determining the video scan type according to the pixel characteristics of a video, and when the video is an interlaced-scan video, determining the field order of the video.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure describes a method and a system for detecting a video scan type of a video. The method detects the video scan type according to pixel characteristics of frames extracted from the video. The method is applicable to a video such as a streaming video. A header of the streaming video generally records information such as a file format, a scan format, a file size, and a video resolution of the video. Thus, a video player can rely on the information of the header to decode and play the video. As the scan format indicates the video scan type of the video, correct header information would allow the player to play the video correctly; on the other hand, wrong header information may lead to the occurrence of image deflection, e.g., the zipper phenomenon or zigzagging, as the video is played.

The disclosed method for detecting a video scan type can be operated in a software or hardware player. A video decoder or an application-specific integrated circuit (ASIC) used in the player is configured to perform the method. The video can be inputted to a system including a processor and a memory via an input interface and be processed by the processor performing the method. The system provides a technical solution that does not rely on the video header, as opposed to the conventional player that relies directly on the video scan type recorded in the header. In the method, the scan lines of the frames extracted from the input video are rearranged. The pixel characteristics among the rearranged scan lines are analyzed and referred to for identifying the video as a progressive-scan video or an interlaced-scan video. Moreover, the method can determine a field order when the video is determined as an interlaced-scan video. Lastly, the video scan type, or including the field order of an interlaced-scan video, can be stored in a memory of the player.

In one embodiment of the present disclosure, a software can be used to detect the video scan type in real time while playing a video. When the video is inputted to a player applying the foregoing software detection method, a software sequence begins performing the method for detecting the video scan type. This software sequence stops when the video scan type is verified. The player then continues to play the video according to the determined video scan type. Moreover, in order to exclude determination errors, multiple verifications may be required, or a threshold may be introduced, to reconfirm the video scan type of the video.

Figure 1A:
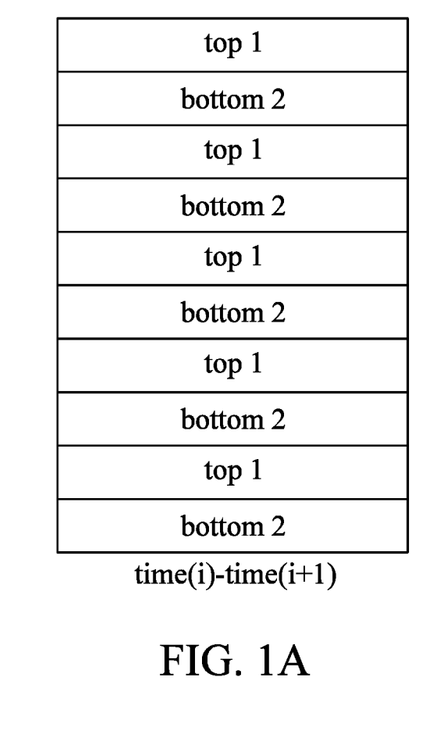
FIGS. 1A, 1B and 1C show schematic diagrams depicting an interlaced-scan video.
Figure 1B:
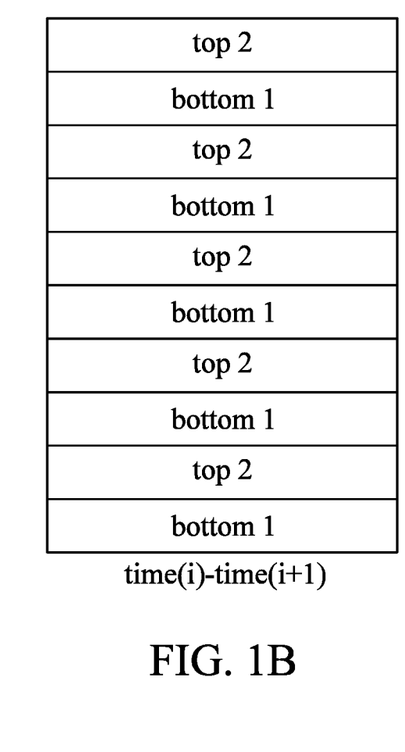

It should be noted that the scan lines of each frame of the interlaced-scan video are divided into a set of top field scan lines and a set of bottom field scan lines while playing the interlaced-scan video. The scan type of the interlaced-scan video can be top field display first or bottom field display first. FIG. 1A and FIG. 1B show schematic diagrams depicting the top field display first and bottom field display first scan lines of the interlaced-scan video.

In the diagram of FIG. 1A showing top field display first scan lines, a frame of the video includes a set of scan lines. In the interlaced-scan video with top field display first scan lines, the top fields (top 1) are scanned at a first time (i), and the bottom fields (bottom 2) are scanned at a second time (i+1) to form a frame.

FIG. 1B shows a diagram depicting a frame with bottom field display first scan lines. In the interlaced-scan video with the bottom field display first scan lines, each frame includes the bottom fields (bottom 1) that are scanned at a first time (i), and the top fields (top 2) that are scanned at a second time (i+1).

Figure 1C:
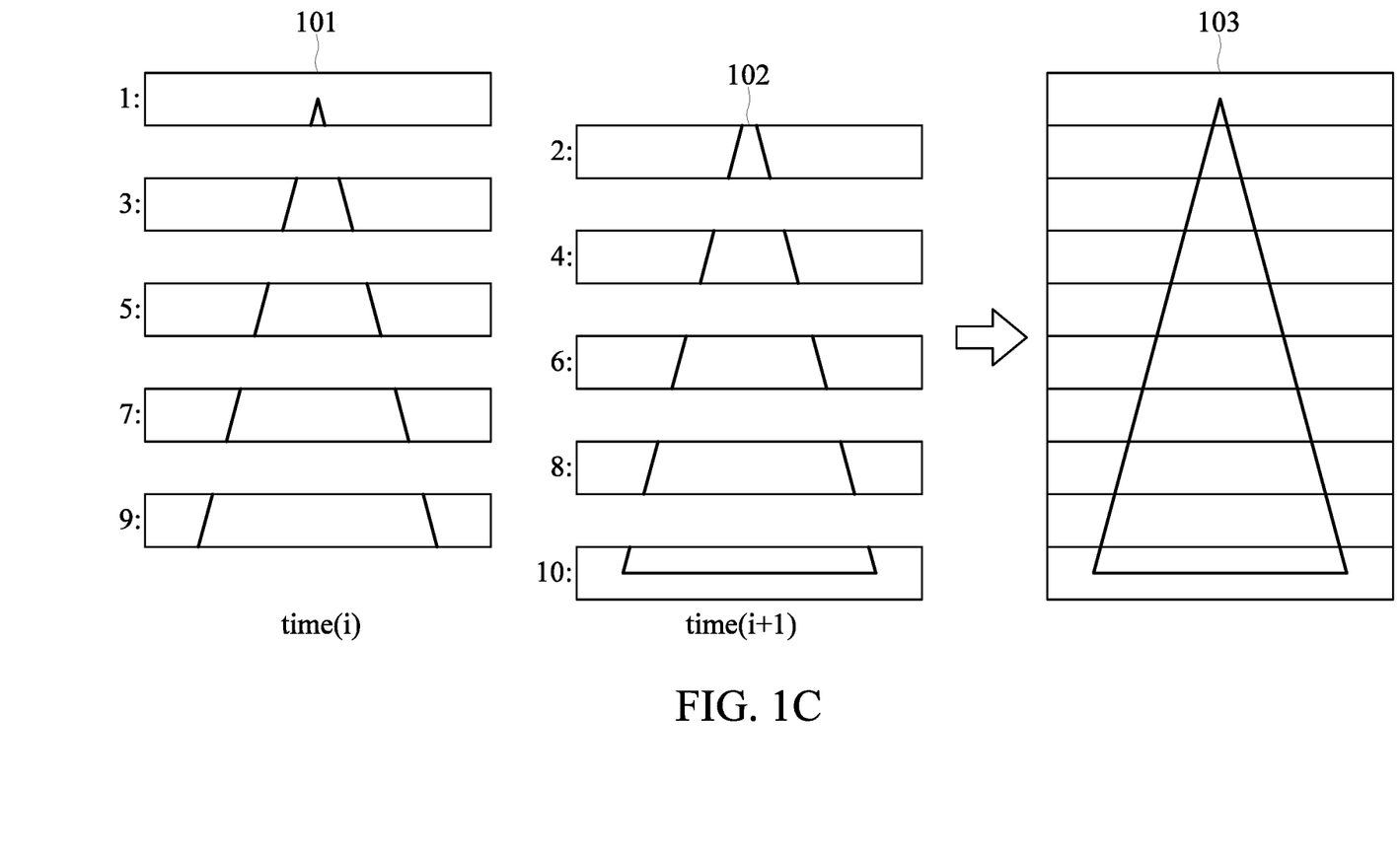

In FIG. 1C, an interlaced-scan video with a field order of top field display first is schematically shown. At the first time (i), the top fields 101 with odd horizontal scan lines numbered 1, 3, 5, 7, 9 are scanned top-to-bottom sequentially. Next, at the second time (i+1), the bottom fields 102 with even horizontal scan lines numbered 2, 4, 6, 8, 10 in the same frame are also scanned sequentially to finally form a full frame 103.

On the other hand, if the field order of an interlaced-scan video is bottom field display first, the scan lines numbered 2, 4, 6, 8, 10 of the bottom fields 102 would be scanned first. The scan lines numbered 1, 3, 5, 7, and 9 of the top fields 101 are then scanned. Thus, if the player cannot correctly recognize the field order while playing the video, a video playback phenomenon would occur, causing the video to jitter.

Figure 2:
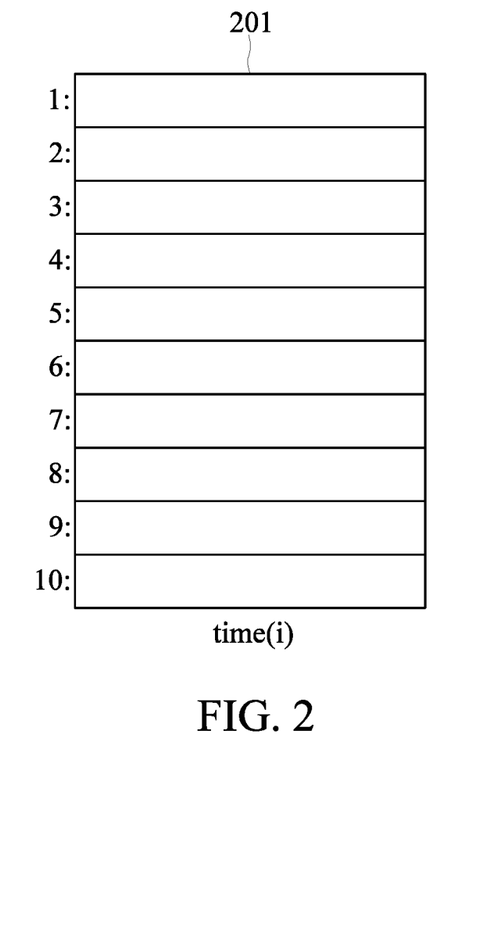
FIG. 2 shows a schematic diagram depicting a progressive-scan video.

FIG. 2 shows a schematic diagram depicting a progressive-scan video. The diagram shows scan lines numbered 1, 2, 3, 4, 5, 6, 7, 8, 9, 10 of a frame 201 of the progressive-scan video that are scanned top-to-bottom at the first time (i). The progressive-scan video requires a higher scanning frequency because the scan lines of the frame thereof are scanned in sequence without time offset. However, the scan type of the progressive-scan video is generally more stable than that of the interlaced-scan video.

The method for detecting the video scan type is used to identify the video as an interlaced-scan video or a progressive-scan video. A field order can be further determined if the video is identified as an interlaced-scan video.

Figure 3:
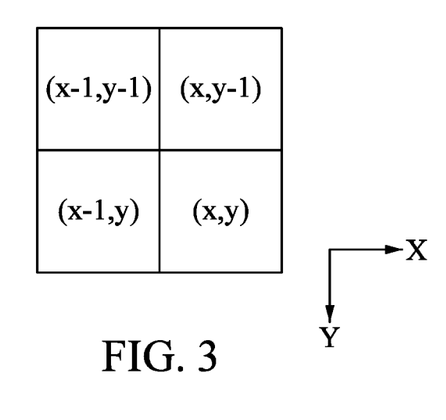
FIG. 3 shows a schematic diagram illustrating a pixel and its neighboring pixels.

The method uses the pixel characteristics of the frames of the video in a scanning process to determine the video scan type. The pixel characteristics refer to the variations of luminance among adjacent pixels. The variation of luminance is provided for the method to calculate a zipper value of each pixel. The zipper value acts as an index for determining a zipper level of a pixel. A pixel and its adjacent pixels are schematically depicted in FIG. 3.

In one embodiment, a zipper index of a frame can be defined according to the zipper values of the pixels of one frame. The zipper index represents the zipper level of the frame. The higher the zipper index of the frame, the higher probability of the interlaced-scan video it can be.

Figure 5:
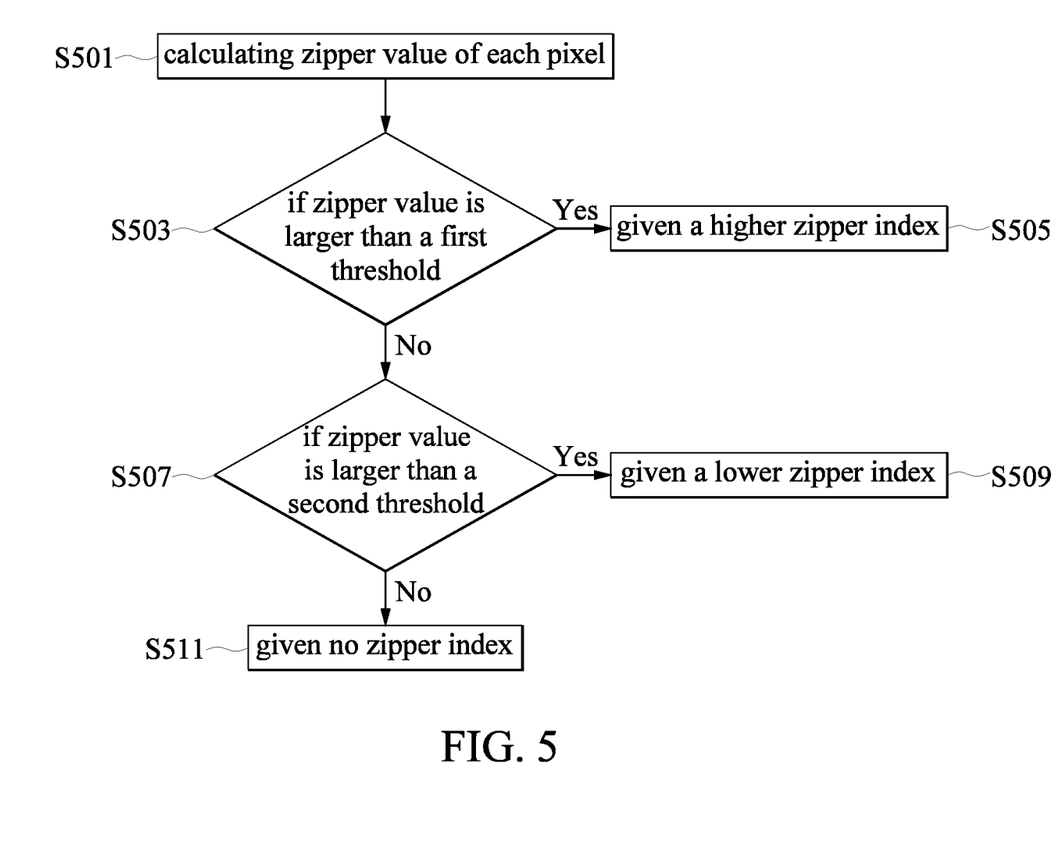
FIG. 5 shows a flow chart describing a process of determining a zipper index for each frame in one embodiment of the disclosure.

The process of calculating the zipper index of one frame is exemplarily shown in FIG. 5. In the beginning, such as in step S501, a zipper value with respect to each pixel of a frame is calculated. Multiple pixels in a frame represented by the pixels exemplarily shown in FIG. 3 are marked as (x,y), (x−1,y), (x,y−1) and (x−1,y−1). From the pixel (x,y), an adjacent pixel is located at (x−1,y) in the X direction; another adjacent pixel is located at (x,y−1) in the Y direction; and a diagonally adjacent pixel is located at (x−1,y−1). The current example uses the pixel values in YUV color space, in which 'Y' indicates luminance, 'U' and 'V' indicate the chrominance. Formula (1) and formula (2) use the luminance ('Y') in the YUV color space to calculate the zipper value of each pixel.

In an exemplary example, formula (1) first acquires a luminance Y(x,y) of the pixel (x,y) and a luminance Y(x−1,y) of the pixel (x−1,y). After subtracting the luminance Y(x,y) and the luminance Y(x−1,y), a value $I_x$ that indicates a luminance difference in the X direction can be obtained. Similarly, formula (2) is used to obtain another luminance difference $I_y$ in the Y direction between a luminance of the pixel (x,y) and a luminance of the pixel (x,y−1).

$$I_x = Y(x,y) - Y(x-1,y) \quad \text{formula (1)}$$

$$I_y = Y(x,y) - Y(x,y-1) \quad \text{formula (2)}$$

$$s = |I_y| - |I_x| \quad \text{formula (3)}$$

A zipper value k is defined as:
If s≤0; k=0;
If s>0; k=s.

In the formula (3), a difference s between absolute values of the luminance difference $I_x$ in the X direction and the luminance difference $I_y$ in the Y direction. Since the pixels in a same frame of an interlaced-scan video may have discontinuous luminance in the Y direction, the formula (3) can be used to determine that the pixel is a non-zipper pixel when the Y-direction luminance difference is smaller than or equal to the X-direction luminance difference (s≤0; k=0); or determine that the pixel is a zipper pixel when the Y-direction luminance difference is larger than the X-direction luminance difference (s>0; k=s).

It should be noted that if only the luminance variation in the Y direction is considered, as in the conventional technology, subtle variations in luminance along the Y direction could very well be misjudged as a zipper phenomenon of an interlaced scan video. As compared with the conventional technology, the above-mentioned zipper value k is defined according to the variation of pixel luminance in both the X direction and the Y direction. That is, the pixel would be determined as a zipper pixel only if the Y-direction luminance difference is larger than the X-direction luminance difference. Therefore, the method for detecting the video scan type of the disclosure effectively improves the accuracy of determining the video scan type by reducing the occurrence of misjudgment.

Next, in step S503, it is determined whether the zipper value of a pixel is larger than a first threshold. If the zipper value is larger than the first threshold, such as in step S505, the system gives the pixel a higher zipper index, e.g. the zipper index 2. If the zipper value is not larger than the first threshold, such as in step S507, it is then determined whether the pixel zipper value is larger than a second threshold. It should be noted that the second threshold is smaller than the first threshold. If the zipper value is larger than the second threshold, such as in step S509, the system gives a lower zipper index to the pixel, e.g. the zipper index 1. In the embodiment, if the zipper value is smaller than both the first and second thresholds, such as in step S511, the system gives no zipper index to the pixel. The zipper indexes of the pixels in one frame are summed for obtaining a zipper index for the frame.

It should be noted that the number of thresholds used for determining the zipper index of a pixel is not limited, and the method does not restrict which pixels are used for calculating the zipper value of the frame.

Although the zipper index of a frame indicates the zipper level of the frame, a higher zipper index would also indicate a higher probability that the frame is in an interlaced-scan video. It should be noted that in the conventional technology, if the frame has edges along the X direction (i.e., the horizontal direction), there would be a larger luminance difference along the Y direction of the edges. This may result in a progressive-scan video being erroneously determined as an interlaced-scan video, as the progressive-scan video may still have a higher zipper value on account of the foregoing issue.

For reducing the occurrence of misjudgment due to the horizontal edges, two frames, i.e. a first frame and a second frame, extracted from the video are introduced in the method of the disclosure. Each frame is divided into a set of top fields and a set of bottom fields. A top field of the first frame with a plurality of odd scan lines are combined with a bottom field of the second frame with a plurality of even scan lines so as to form a first test frame. A first zipper index can be calculated from first test frame. A bottom field of the first frame is combined with a top field of the second frame so as to form a second test frame. A second zipper index is then calculated from the second test frame. A zipper index difference between the first zipper index and the second zipper index is calculated for determining the video scan type.

Figure 6A:
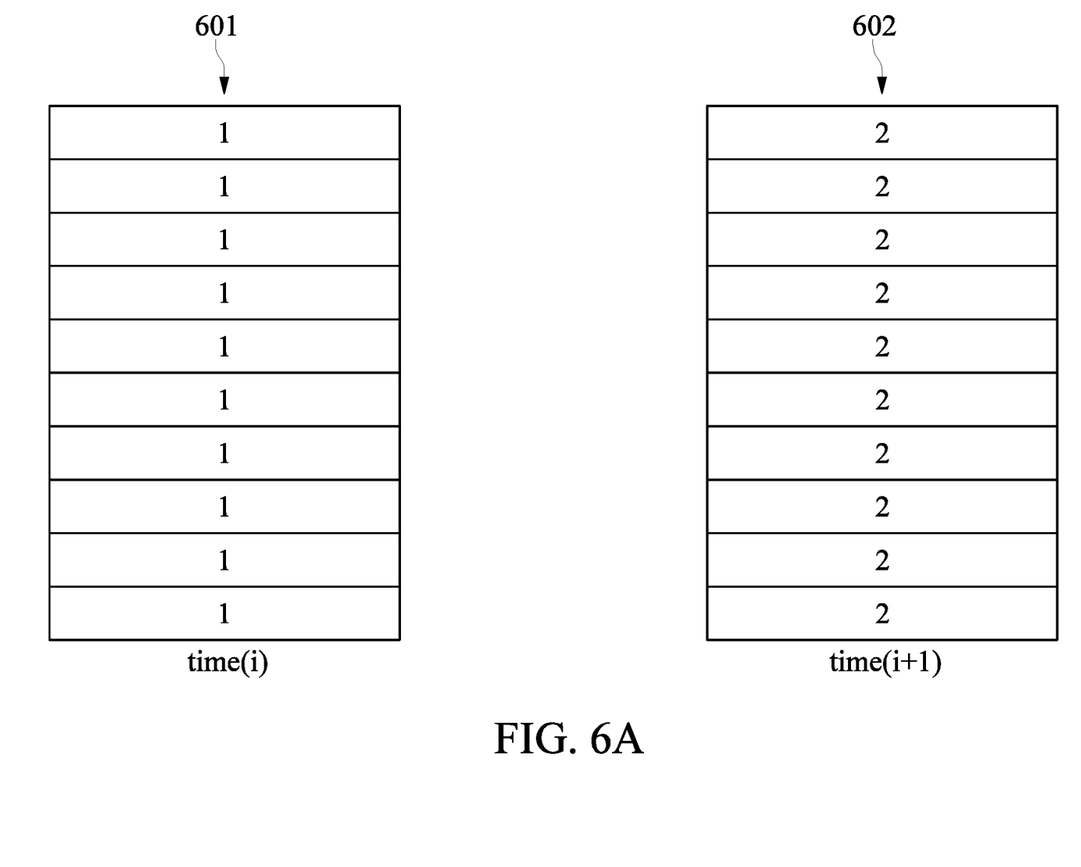
FIGS. 6A through 6B schematically show scan lines extracted from the frames of a progressive-scan video in one embodiment of the disclosure.
Figure 6B:
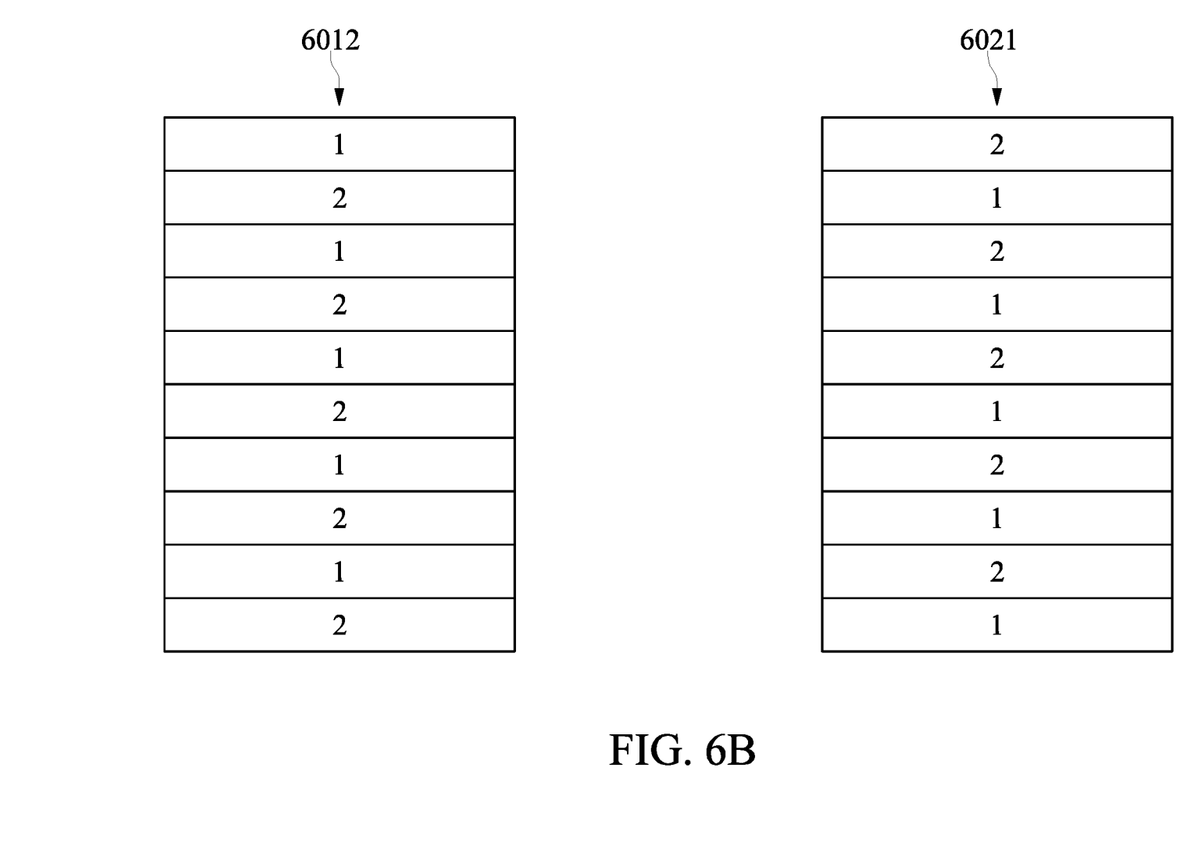

FIG. 6A shows scan lines under a progressive scan type. A first frame 601 is composed of a plurality of scan lines at a first time (i). A second frame 602 is composed of a plurality of scan lines at a second time (i+1). The top field with odd scan lines of the first frame 601 is combined with the bottom field with even scan lines of the second frame 602 so as to form a first test frame 6012 schematically shown in FIG. 6B. The bottom field of the first frame 601 and the top field of the second frame 602 shown in FIG. 6A are combined so as to form a second test frame 6021 shown in FIG. 6B. In other words, the first test frame 6012 or the second test frame 6021 emulates an interlaced-scan frame. As shown in FIG. 6B, the time differences between the even scan lines and the odd scan lines in either the first or second test frames 6012, 6021 are the same, i.e. 1 time unit, indicating a difference from time(i) to time(i+1) (e.g., 1/60 of a second). Therefore, there would not be a large difference between a zipper index of the first test frame 6012 and a zipper index of the second test frame 6021.

It is worth noting that even though the video includes some edges in the X direction (i.e., the horizontal direction) and causes a higher zipper index in the first frame 601 and the second frame 602, the zipper index difference between the zipper index of the first test frame 6012 and the zipper index of the second test frame 6021 incorporated in the method for detecting video scan type of the disclosure can effectively eliminate the affect of horizontal edges on the zipper index. Therefore, the method of the present disclosure sets itself apart from the conventional technology in that the method does not rely solely on the zipper index for determining the video scan type, so that misjudgments caused by the horizontal edges can be avoided.

Figure 7A:
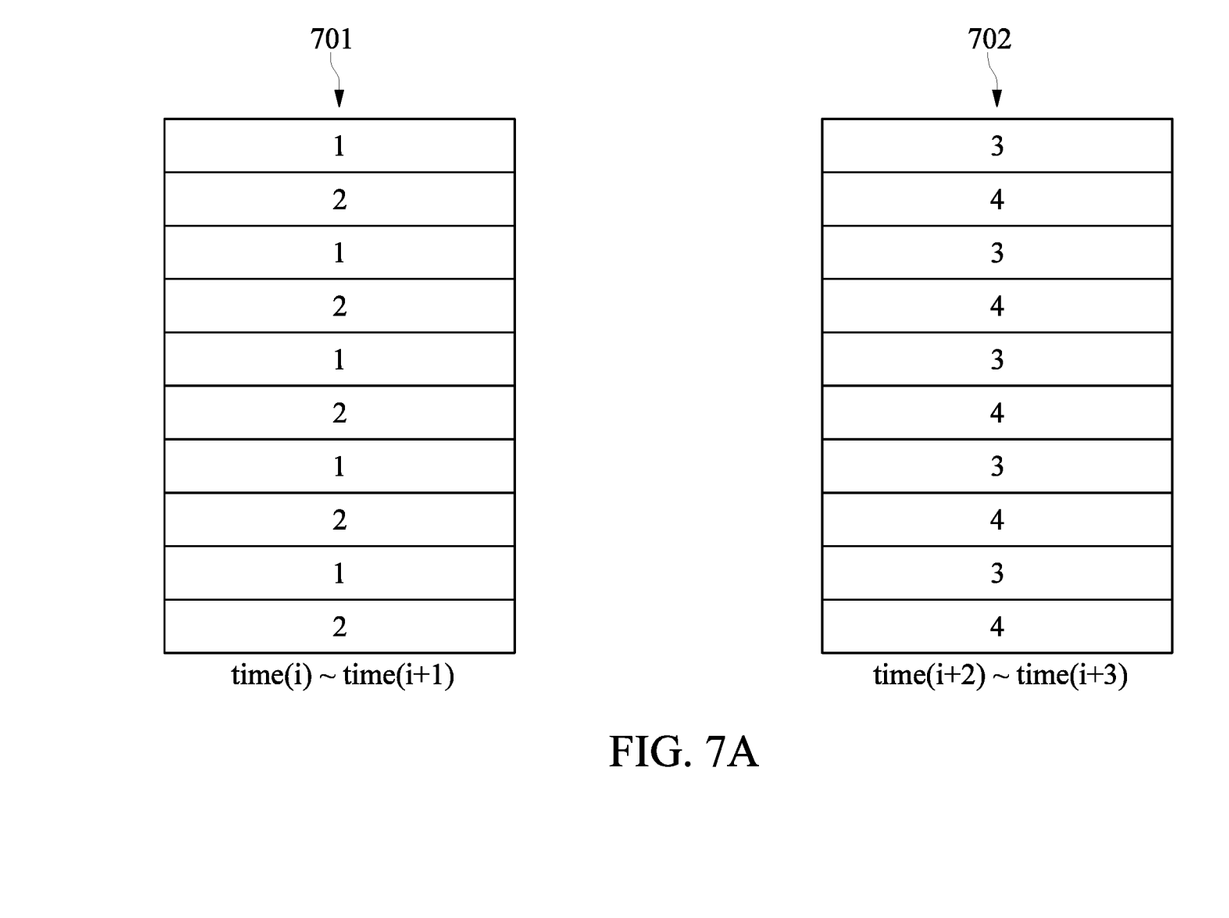
FIGS. 7A through 7B schematically show scan lines extracted from the frames of an interlaced-scan video in one embodiment of the disclosure.
Figure 7B:
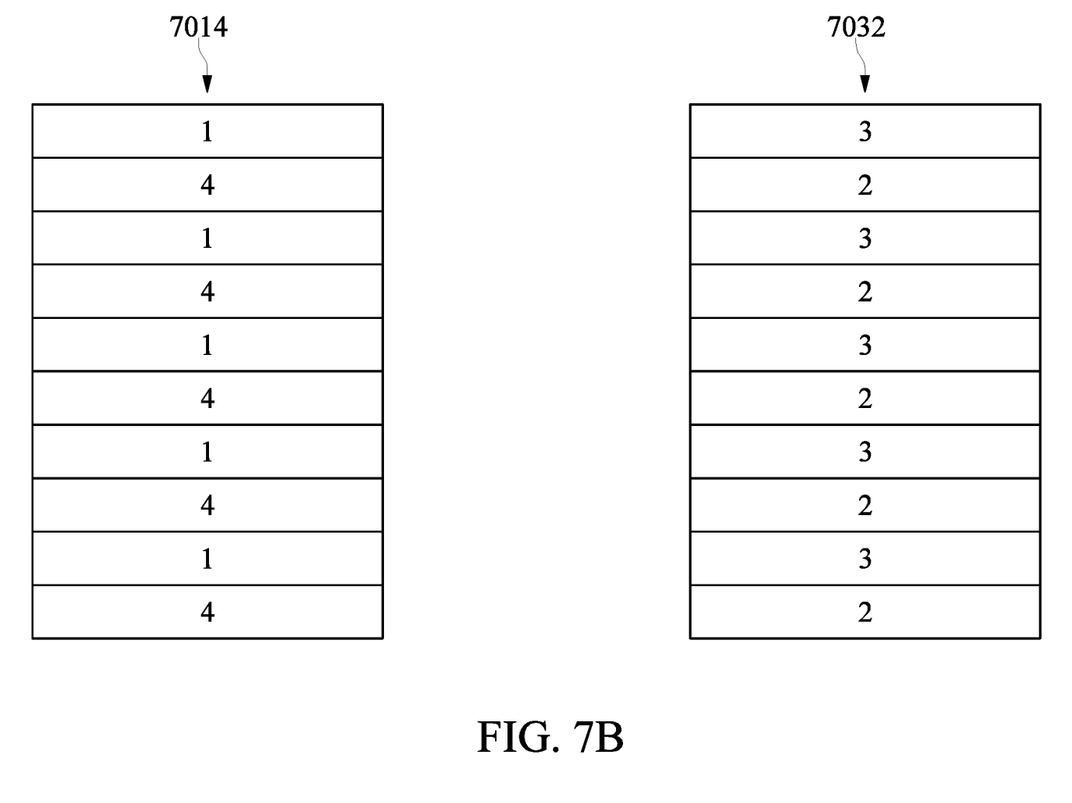

FIGS. 7A and 7B show a situation under an interlaced scan type that introduces an interlaced-scan video with a plurality of top field display first scan lines. The top field of a first frame 701 is composed of odd scan lines at a first time (i). The bottom field of the first frame 701 is composed of even scan lines at a second time (i+1). The top field of a second frame 702 is composed of odd scan lines at a third time (i+2). The bottom field of the second frame 702 is composed of even scan lines at a fourth time (i+3).

The top field of the first frame 701 and the bottom field of the second frame 702 shown in FIG. 7A are combined so as to form a first test frame 7014 shown in FIG. 7B. The bottom field of the first frame 701 and the top field of the second frame 702 are combined so as to form a second test frame 7032 shown in FIG. 7B. FIG. 7B shows a time difference of 3 time units from time(i) to time (i+3) between the even scan lines and the odd scan line of the first test frame 7014. On the other hand, there is only 1 time unit from time(i+1) to time(i+2) between the even scan lines and the odd scan lines of the second test frame 7032. Therefore, the zipper index of the first test frame 7014 is significantly larger than the zipper index of the second test frame 7032.

Figure 8A:
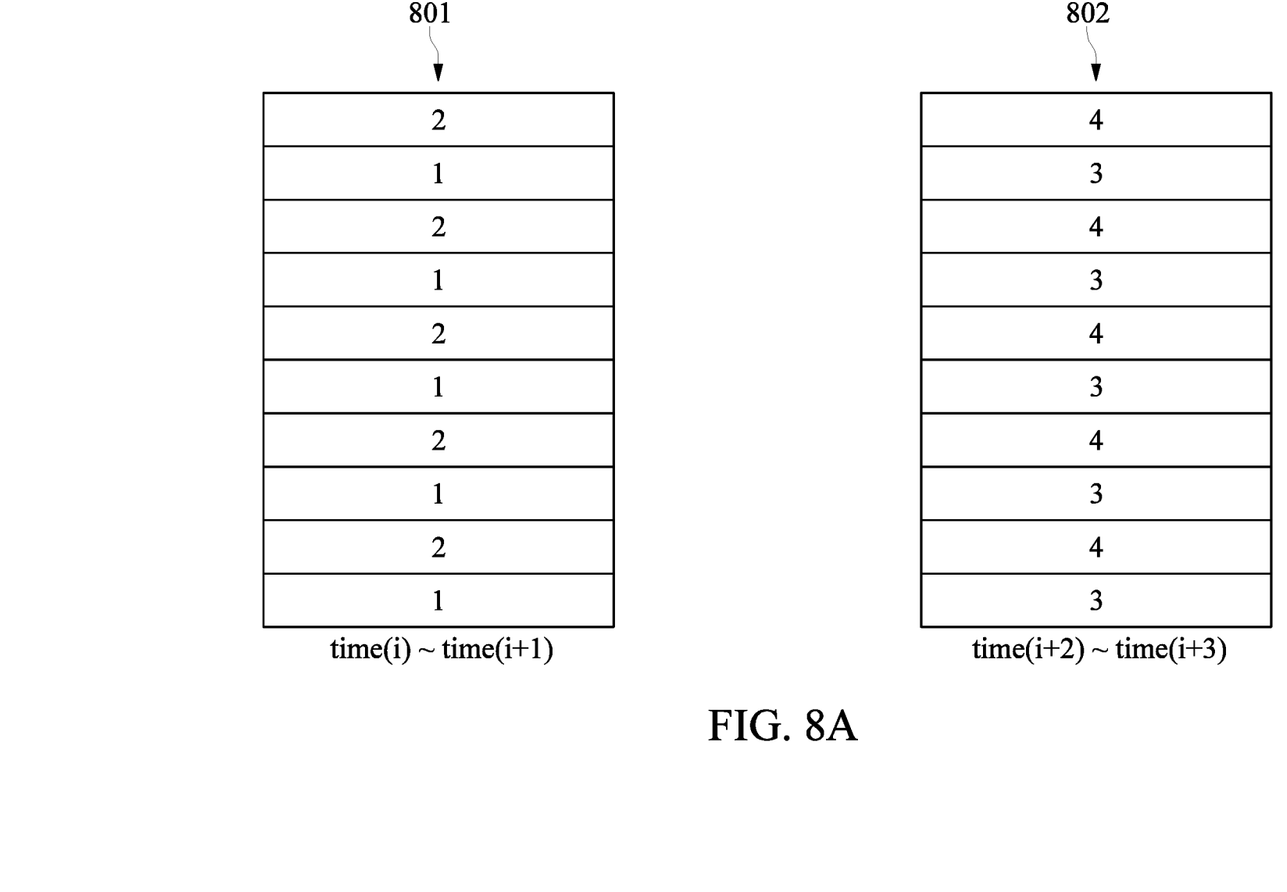
FIGS. 8A through 8B show another schematic view of the scan lines extracted from the frames of interlaced-scan video in another embodiment of the disclosure.
Figure 8B:
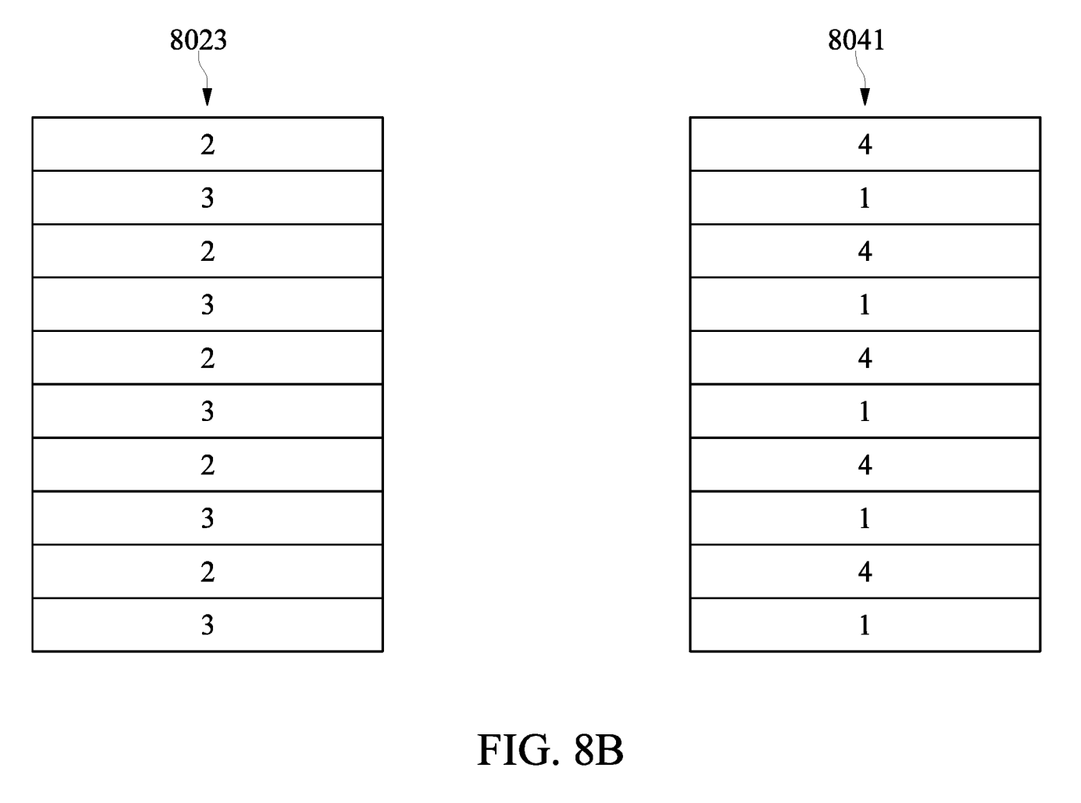

Reference is made to both FIG. 8A and FIG. 8B. FIG. 8A shows the scan lines of a bottom field display first interlaced-scan video. The bottom field of a first frame 801 is composed of even scan lines at a first time (i). The top field of the first frame 801 is composed of odd scan lines at a second time (i+1). The bottom field of a second frame 802 is composed of even scan lines at a third time (i+2). The top field of the second frame 802 is composed of odd scan lines at a fourth time (i+3). The top field of the first frame 801 and the bottom field of the second frame 802 shown in FIG. 8A are combined so as to form a first test frame 8023 of FIG. 8B. The bottom field of the first frame 801 and the top field of the second frame 802 are combined so as to form a second test frame 8041 of FIG. 8B. As shown in FIG. 8B, a time difference between the even scan lines and the odd scan lines of the first test frame 8023 is only 1 time unit from time(i+1) to time(i+2). The time difference between the even scan lines and the odd scan lines of the second test frame 8041 is 3 time units from time (i) to time(i+3). This will cause the zipper index of the second test frame 8041 to be significantly larger than the zipper index of the first test frame 8023.

Figure 4:
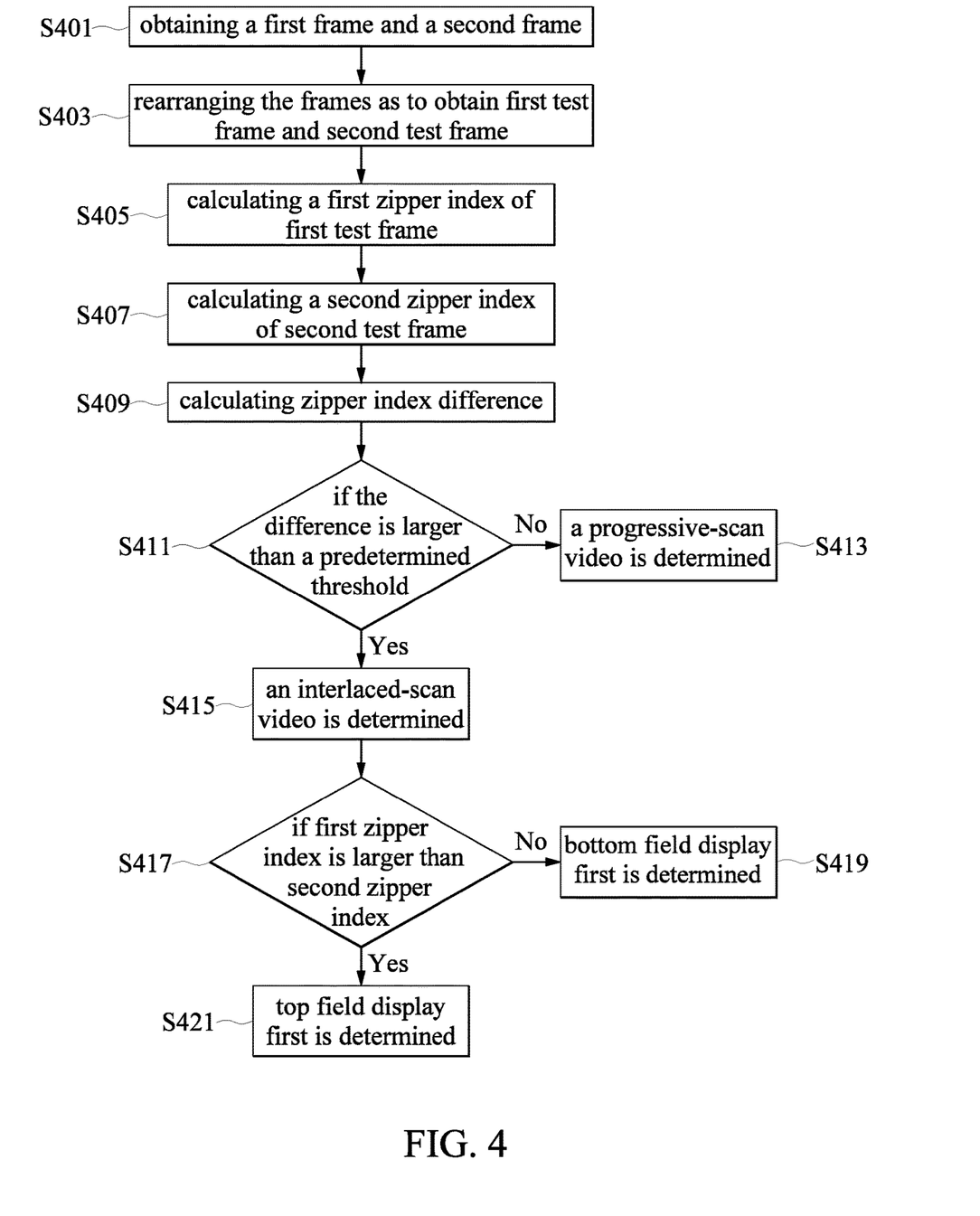
FIG. 4 shows a flow chart describing a process of detecting a video scan type in one embodiment of the disclosure.

According to the above description, the method for detecting video scan type of the disclosure can be summarized as a flow chart as shown in FIG. 4.

In the process, starting with step S401, two frames, e.g. a first time and a second frame, are extracted from a video. In step S403, each of the first frame and the second frame is divided into a top field and a bottom field. The scan lines of the top fields and the bottom fields are rearranged to obtain a first test frame and a second test frame. For example, the top field of the first frame and the bottom field of the second frame are rearranged to form the first test frame; and the bottom field of the first frame and the top field of the second frame are rearranged to form the second test frame.

In step S405, the above-mentioned zipper value algorithm calculates a first zipper index for the first test frame. In step S407, a second zipper index for the second test frame is calculated.

In step S409, a zipper index difference between the first zipper index and the second zipper index is calculated. The principle thereof is described as in the above embodiments. If an interlaced-scan video is inputted, the first and second test frames of the video are divided into the top fields and the bottom fields. There will be a significant difference, i.e. a zipper index difference, between the zipper index calculated from the rearranged first test frame and the zipper index calculated from the second test frame. A proper threshold can be introduced for determining the video scan type. In an exemplary example, the zipper index difference is compared with a predetermined threshold. In step S411, the method determines if the zipper index difference is larger than this predetermined threshold.

In step S413, according to the zipper index difference, a video scan type of the video can be determined. The video is a progressive-scan video if the zipper index difference is not larger than the predetermined threshold.

In step S415, the video is an interlaced-scan video if the zipper index difference is larger than a predetermined threshold.

If the video is determined as the interlaced-scan video, the method goes on to determine if the field order of the interlaced-scan video is a top field display first video or a bottom field display first video.

In step S417, comparing the first zipper index with the second zipper index, it is determined whether the first zipper index is larger as compared with the second zipper index. In step S419, it is determined that the video is a bottom field display first video if the first zipper index is not larger than the second zipper index. In step S421, the video is a top field display first video if the first zipper index is larger than the second zipper index. In addition, a filter can be introduced for performing a horizontal low-pass filtering on the pixel information of the video between the step S401 and the step S403 in order to improve the accuracy of the zipper value by reducing the details of the video in the horizontal direction.

In sum, the above embodiments of the method and the system for determining the video scan type are not based on the header information of the video but based on the pixel characteristics thereof. A first test frame and a second test frame are formed by top and bottom fields of a first frame and a second frame extracted from the video. A zipper index difference between the zipper indexes of the first test frame and second test frame is introduced to determine if the video is a progressive-scan video or an interlaced-scan video. Further, a field order of the interlaced-scan video can also be determined according to a comparison between the zipper indexes of the first and the second test frames. The zipper index difference used in the method for determining the video scan type can effectively eliminate the negative impact of horizontal edges to the zipper index and improve determination accuracy. The method can be operated in a hardware or software player. The method and system allow the player to correctly decode and play the video since the video scan type can be determined correctly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for detecting a video scan type, comprising:
    obtaining pixel information relating to a first frame and a second frame extracted from a video;
    dividing scan lines of each of the first frame and the second frame into a top field and a bottom field;
    using a zipper value algorithm to calculate a zipper value based on variation of luminance of adjacent pixels according to luminance of each pixel of the frame so as to calculate a first zipper index from a combination of the top field of the first frame and the bottom field of the second frame and a second zipper index from a combination of the bottom field of the first frame and the top field of the second frame;
    calculating a zipper index difference between the first zipper index and the second zipper index;
    according to the zipper index difference, determining a video scan type of the video; wherein, the video is an interlaced-scan video if the zipper index difference is larger than a predetermined threshold, and the video is a progressive-scan video if the zipper index difference is not larger than the predetermined threshold.

2. The method as recited in claim 1, wherein when the video is determined as the interlaced-scan video, a field order of the interlaced-scan video is determined by comparing the first zipper index with the second zipper index; wherein the interlaced-scan video is bottom field display first if the second zipper index is larger than the first zipper index, and the interlaced-scan video is top field display first if the first zipper index is larger than the second zipper index.

3. The method as recited in claim 1, further comprising performing a horizontal low-pass filtering on the pixel information of the video.

4. The method as recited in claim 1, wherein the zipper value algorithm is:

$$I_x = Y(x,y) - Y(x-1,y)$$

$$I_y = Y(x,y) - Y(x,y-1)$$

$$s = |I_y| - |I_x|$$

If $s \leq 0$; $k = 0$;
If $s > 0$; $k = s$
    wherein, the positions of the pixels are marked as (x,y), (x−1,y), (x,y−1) and (x−1,y−1); Y indicates a luminance within a YUV color space; $I_x$ indicates a luminance difference in an X direction; $I_y$ indicates a luminance difference in a Y direction; s is a difference between an absolute value of $I_x$ and an absolute value of $I_y$; wherein the zipper value k is 0 if s is smaller than or equal to 0, and the zipper value k equals s if s is larger than 0.

5. The method as recited in claim 4, wherein, a higher zipper value is given to the pixel if the zipper value of the pixel is larger than a first threshold.

6. The method as recited in claim 5, wherein a lower zipper index is given to the pixel if the zipper value of the pixel is not larger than the first threshold but larger than a second threshold, and no zipper index is given if the zipper value of the pixel is smaller than both the first threshold and the second threshold.

7. The method as recited in claim 6, wherein when the video is determined as the interlaced-scan video, a field order of the interlaced-scan video is determined by comparing the first zipper index with the second zipper index; wherein the interlaced-scan video is bottom field display first if the second zipper index is larger than the first zipper index, and the interlaced-scan video is top field display first if the first zipper index is larger than the second zipper index.

8. The method as recited in claim 7, wherein when the video scan type of the video is determined, the video is played according to the determined video scan type.

9. A system for detecting a video scan type for a player, comprising:
    a memory and a processor, the processor performing a method for detecting the video scan type, including:
        obtaining pixel information relating to a first frame and a second frame extracted from a video;
        dividing scan lines of each of the first frame and the second frame into a top field and a bottom field;
        using a zipper value algorithm to calculate a zipper value based on variation of luminance of adjacent pixels according to luminance of each pixel of the frame so as to calculate a first zipper index from a combination of the top field of the first frame and the bottom field of the second frame and a second zipper index from a combination of the bottom field of the first frame and the top field of the second frame;
        calculating a zipper index difference between the first zipper index and the second zipper index;
        according to the zipper index difference, determining a video scan type of the video; wherein, the video is an interlaced-scan video if the zipper index difference is larger than a predetermined threshold, the video is a progressive-scan video if the zipper index difference is not larger than the predetermined threshold.

10. The system as recited in claim 9, wherein when the video is determined as the interlaced-scan video, a field order of the interlaced-scan video is determined by comparing the first zipper index with the second zipper index; wherein the interlaced-scan video is bottom field display first if the second zipper index is larger than the first zipper index, and the interlaced-scan video is top field display first if the first zipper index is larger than the second zipper index.

11. The system as recited in claim 9, further comprising performing a horizontal low-pass filtering on the pixel information of the video.

12. The system as recited in claim 9, wherein the determined video scan type is stored in the memory, and the determined field order is also stored in the memory if the video is determined as the interlaced-scan video.

13. The system as recited in claim 9, wherein the zipper value algorithm is:

$$I_x = Y(x,y) - Y(x-1,y)$$

$$I_y = Y(x,y) - Y(x,y-1)$$

$$s=|I_y|-|I_x|$$

If s≤0; k=0;

If s>0; k=s wherein the positions of the pixels are marked as (x,y), (x−1,y), (x,y−1) and (x−1,y−1); Y indicates a luminance within a YUV color space; $I_x$ indicates a luminance difference in an X direction; $I_y$ indicates a luminance difference in a Y direction; s is a difference between an absolute value of $I_x$ and an absolute value of $I_y$; wherein the zipper value k is 0 if s is smaller than or equal to 0; the zipper value k equals s if s is larger than 0.

14. The system as recited in claim 13, wherein, a higher zipper value is given to the pixel if the zipper value of the pixel is larger than a first threshold.

15. The system as recited in claim 14, wherein a lower zipper index is given to the pixel if the zipper value of the pixel is not larger than the first threshold and larger than a second threshold, and no zipper index is given if the zipper value of the pixel is smaller than both the first threshold and the second threshold.

16. The system as recited in claim 15, wherein, when the video is determined as the interlaced-scan video, a field order of the interlaced-scan video is determined by comparing the first zipper index with the second zipper index; wherein, the interlaced-scan video is bottom field display first if the second zipper index is larger than the first zipper index, and the interlaced-scan video is top field display first if the first zipper index is larger than the second zipper index.

17. The system as recited in claim 16, wherein when the video scan type of the video is determined, the video is played according to the determined video scan type.

18. The system as recited in claim 17, wherein the determined video scan type is stored in the memory, and the determined field order is also stored in the memory if the video is determined as the interlaced-scan video.

* * * * *